United States Patent
Rao S J et al.

(10) Patent No.: US 12,411,761 B1
(45) Date of Patent: Sep. 9, 2025

(54) FULLY CACHE COHERENT VIRTUAL PARTITIONS IN MULTITENANT CONFIGURATIONS IN A MULTIPROCESSOR SYSTEM

(71) Applicant: NVIDIA CORPORATION, Santa Clara, CA (US)

(72) Inventors: Adarsha Rao S J, Karnataka (IN); Sanjay R. Deshpande, San Jose, CA (US); Raghuram L, Karnataka (IN); Anirudh B K, Karnataka (IN); Harsh Kumar, San Jose, CA (US); Kun Fang, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 2 days.

(21) Appl. No.: 18/598,997

(22) Filed: Mar. 7, 2024

(51) Int. Cl.
| | |
|---|---|
| *G06F 9/30* | (2018.01) |
| *G06F 9/38* | (2018.01) |
| *G06F 9/50* | (2006.01) |
| *G06F 9/52* | (2006.01) |
| *G06F 12/02* | (2006.01) |
| *G06F 12/0831* | (2016.01) |
| *G06F 12/0895* | (2016.01) |

(52) U.S. Cl.
CPC ........ *G06F 12/0246* (2013.01); *G06F 9/3004* (2013.01); *G06F 9/3885* (2013.01); *G06F 9/5077* (2013.01); *G06F 9/52* (2013.01); *G06F 12/0831* (2013.01); *G06F 12/0895* (2013.01)

(58) Field of Classification Search
CPC .. G06F 12/0246; G06F 9/3004; G06F 9/3885; G06F 9/5077; G06F 9/52; G06F 12/0831; G06F 12/0895
See application file for complete search history.

(56) References Cited

U.S. PATENT DOCUMENTS

| | | | |
|---|---|---|---|
| 6,801,986 B2* | 10/2004 | Steely, Jr. | G06F 9/30087 710/200 |
| 6,829,683 B1* | 12/2004 | Kuskin | G06F 12/0828 711/143 |
| 7,216,205 B2* | 5/2007 | Greer | G06F 12/0822 709/212 |
| 7,971,030 B2* | 6/2011 | O'Sullivan | G06F 9/30083 712/34 |

(Continued)

*Primary Examiner* — Corey S Faherty
(74) *Attorney, Agent, or Firm* — Squire Patton Boggs LLP; Sarah Mirza

(57) ABSTRACT

Various embodiments include techniques for processing memory operations in a computing system. The computing system includes a central processing unit (CPU) and an auxiliary processor, such as a parallel processing unit (PPU). The PPU can be divided into multiple partitions. Although the partitions are included in a single PPU, the CPU can track the partitions as if the partitions are independent devices rather than different portions of a single device. When two different partitions generate memory operations that access the same memory address in CPU memory address space, the two partitions employ two different data paths. The CPU can use path information for the two different paths to identify which partition generated each memory operation. As a result, the CPU can maintain data consistency and memory coherency in a system where a PPU is divided into multiple partitions.

20 Claims, 5 Drawing Sheets

(56) References Cited

U.S. PATENT DOCUMENTS

| | | | | |
|---|---|---|---|---|
| 8,392,661 | B1* | 3/2013 | Metcalf | H04L 45/28 |
| | | | | 711/133 |
| 10,915,245 | B2* | 2/2021 | Stabrawa | G06F 3/0683 |
| 10,983,794 | B2* | 4/2021 | Lueh | G06F 9/3851 |
| 11,055,809 | B2* | 7/2021 | Shah | G06F 9/3836 |
| 11,397,625 | B2* | 7/2022 | France-Pillois | G06F 9/524 |
| 2020/0257827 | A1* | 8/2020 | Kounavis | H04L 9/0637 |
| 2024/0211258 | A1* | 6/2024 | Dhillon | G06F 9/30189 |

* cited by examiner

FULLY CACHE COHERENT VIRTUAL PARTITIONS IN MULTITENANT CONFIGURATIONS IN A MULTIPROCESSOR SYSTEM

BACKGROUND

Field of the Various Embodiments

Various embodiments relate generally to computer system architectures and, more specifically, to fully cache coherent virtual partitions in multitenant configurations in a multiprocessor system.

DESCRIPTION OF THE RELATED ART

A computing system generally includes, among other things, one or more processing units, such as central processing units (CPUs) and/or graphics processing units (GPUs), one or more memory systems, and one or more networks. Processing units execute user mode software applications, which submit and launch compute tasks, executing on one or more compute engines included in the processing units. In operation, processing units load data from the one or more memory systems, perform various arithmetic and logical operations on the data, and store data back to the one or more memory systems. A given processing unit, such as a GPU, can be configured to implement multiple processing contexts simultaneously by dividing the resources of the processing unit among multiple engines. These multiple engines are referred to herein as simultaneous multiple context (SMC) engines or multi-instance GPUs (MIGs). Each of the engines is allocated a portion of the processing unit, including a portion of the compute resources, graphics resources, memory resources, and/or the like. The portion of the compute resources, graphics resources, memory resources, and/or the like that are allocated to an engine is referred to as an SMC partition, a MIG partition, or, more simply, a partition. In some examples, a cloud service provider can divide the processing unit into multiple independently operated partitions that act as virtual machines (VMs) for the different tenants of the cloud service provider. These multiple partitions can be allocated to different tenants, such as by allocating one or more first partitions to a first tenant and by allocating one or more second partitions to a second tenant. As described herein, each tenant executes on one or more partitions without causing interference to or being interfered with by other tenants.

Conventionally, the partitions only support one-way memory coherency where the CPU can take ownership of, and coherently access, memory addresses in GPU memory space. However, the GPU cannot take ownership of, and coherently access, memory addresses in CPU memory space. The GPU address map is configured to ensure that each partition has a separate, dedicated GPU memory address space, where the GPU memory address space for one partition does not overlap with the GPU memory address space for another partition. This configuration of non-overlapping GPU memory address spaces allows the CPU to be agnostic as to how many partitions are active. As a result, the CPU can access the entire GPU memory address space allocated to the multiple partitions as if the multiple partitions were a single device. Conversely, partitions in the GPU can only access the CPU memory address space in a non-coherent manner. As a result, each software application has the responsibility of ensuring that multiple partitions do not generate conflicting memory accesses to the same CPU memory location from multiple partitions.

One problem with this approach for accessing CPU memory address space from multiple partitions is that the burden is on software engineers to carefully design software applications so as to avoid such conflicting memory accesses. Placing this burden on software engineers causes additional complexity in the design and implementation of software applications. Further, if software applications are not designed to avoid conflicting memory accesses, data stored in the CPU memory address space by a first partition can be incorrectly overwritten by a second GPU partition. As a result, a third partition that intends to load the correct data stored by the first partition instead loads the incorrect data stored by the second partition, which can lead to incorrect results and/or operational errors.

As the foregoing illustrates, what is needed in the art are more effective techniques for processing memory operations in a multi-partition computing system.

SUMMARY

Various embodiments of the present disclosure set forth a computer-implemented method for processing memory operations in a multiprocessor system. The method includes determining that a first memory operation generated by a first partition of an auxiliary processor is directed to a first memory address that is owned by a second partition of the auxiliary processor. The method further includes associating the first memory address with the first partition. The method further includes transferring an ownership of the first memory address from the second partition to the first partition. The method further includes returning data stored at the first memory address to the first partition.

Other embodiments include, without limitation, a system that implements one or more aspects of the disclosed techniques, and one or more computer readable media including instructions for performing one or more aspects of the disclosed techniques, as well as a method for performing one or more aspects of the disclosed techniques.

At least one technical advantage of the disclosed techniques relative to the prior art is that, with the disclosed techniques a CPU can employ path information to uniquely identify partitions included in a single GPU and to track the partitions as independent virtual devices. The CPU hardware can use the path information to grant ownership of a memory address in the CPU memory address space to a particular partition. Further, the CPU hardware can use the path information to regain ownership of the memory address from the particular partition. Because this tracking is performed by the CPU hardware, the software applications executing on the CPU and/or partitions do not have to track memory conflicts in order to maintain memory coherency. These advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
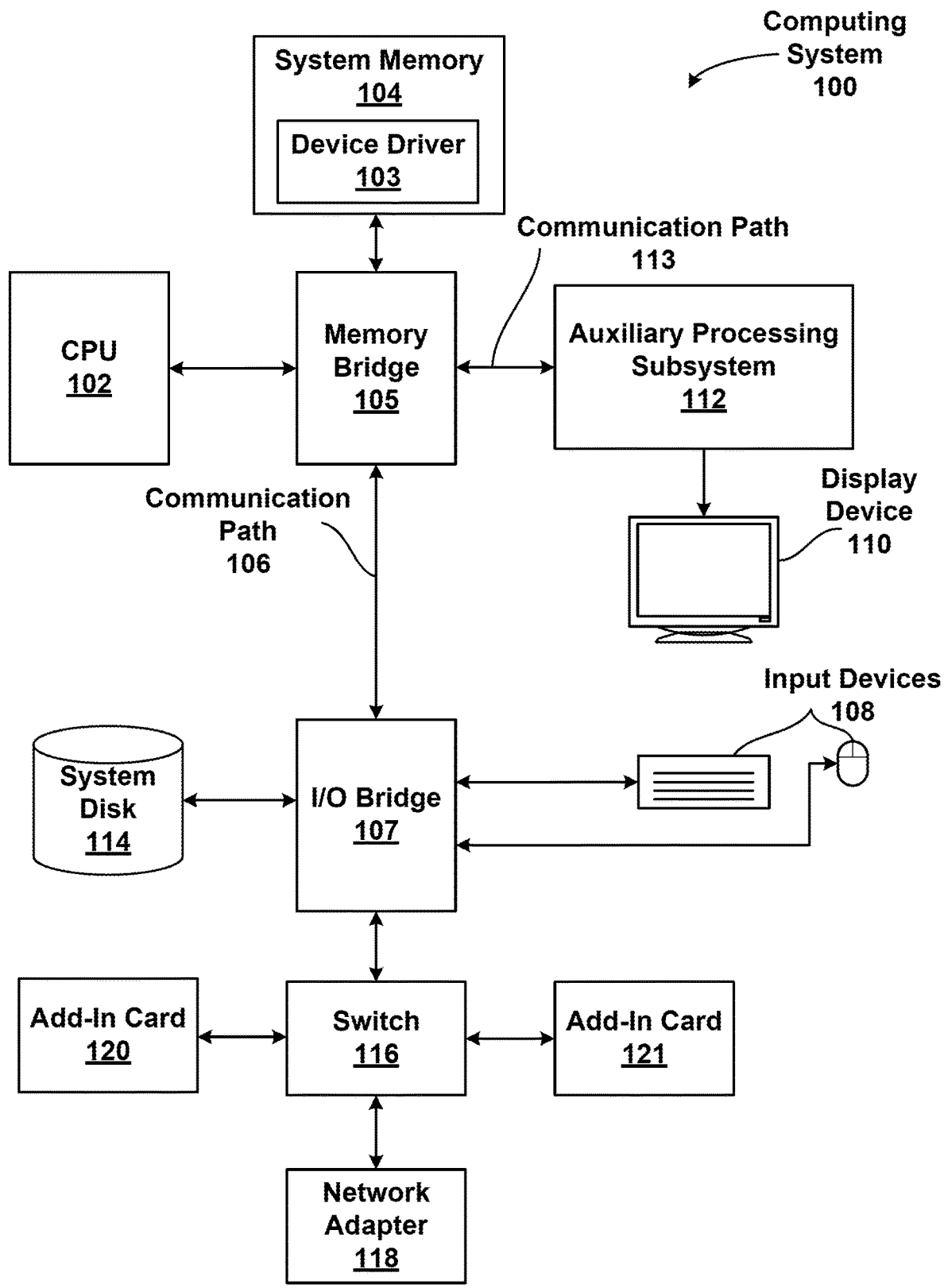
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102 and a system memory 104 coupled to an auxiliary processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. In some examples, input devices 108 are employed to verify the identities of one or more users in order to permit access of computing system 100 to authorized users and deny access of computing system 100 to unauthorized users. Switch 116 is configured to provide connections between I/O bridge 107 and other components of the computing system 100, such as a network adapter 118 and various add-in cards 120 and 121. In some examples, network adapter 118 serves as the primary or exclusive input device to receive input data for processing via the disclosed techniques.

As also shown, I/O bridge 107 is coupled to a system disk 114 that may be configured to store content and applications and data for use by CPU 102 and auxiliary processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computing system 100, may be implemented using any technically suitable protocols, including, without limitation, Peripheral Component Interconnect Express (PCIe), HyperTransport, or any other bus or point-to-point communication protocol known in the art.

In some embodiments, auxiliary processing subsystem 112 comprises a graphics subsystem that delivers pixels to a display device 110 that may be any conventional cathode ray tube, liquid crystal display, light-emitting diode display, or the like. In such embodiments, the auxiliary processing subsystem 112 incorporates circuitry optimized for graphics and video processing, including, for example, video output circuitry. As described in greater detail below in FIG. 2, such circuitry may be incorporated across one or more auxiliary processors included within auxiliary processing subsystem 112. An auxiliary processor includes any one or more processing units that can execute instructions such as a central processing unit (CPU), a parallel processing unit (PPU) of FIGS. 2-4, a graphics processing unit (GPU), a direct memory access (DMA) unit, an intelligence processing unit (IPU), neural processing unit (NPU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, auxiliary processing subsystem 112 includes two processors, referred to herein as a primary processor (normally a CPU) and a secondary processor. Typically, the primary processor is a CPU, and the secondary processor is a GPU. Additionally or alternatively, each of the primary processor and the secondary processor may be any one or more of the types of auxiliary processors disclosed herein, in any technically feasible combination. The secondary processor receives commands from the primary processor via a communication path. The secondary processor accesses a memory and/or other storage system, such as system memory 104, Compute eXpress Link (CXL) memory expanders, memory managed disk storage, on-chip memory, and/or the like. The primary processor and the secondary processor may communicate with one another via a GPU-to-GPU communications channel, such as Nvidia Link (NVLink). Further, the primary processor and the secondary processor may communicate with one another via network adapter 118.

In some embodiments, the auxiliary processing subsystem 112 incorporates circuitry optimized for general purpose and/or compute processing. Again, such circuitry may be incorporated across one or more auxiliary processors included within auxiliary processing subsystem 112 that are configured to perform such general purpose and/or compute operations. In yet other embodiments, the one or more auxiliary processors included within auxiliary processing subsystem 112 may be configured to perform graphics processing, general purpose processing, and compute processing operations. System memory 104 includes at least one device driver 103 configured to manage the processing operations of the one or more auxiliary processors within auxiliary processing subsystem 112.

In various embodiments, auxiliary processing subsystem 112 may be integrated with one or more other the other elements of FIG. 1 to form a single system. For example, auxiliary processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of auxiliary processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, auxiliary processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
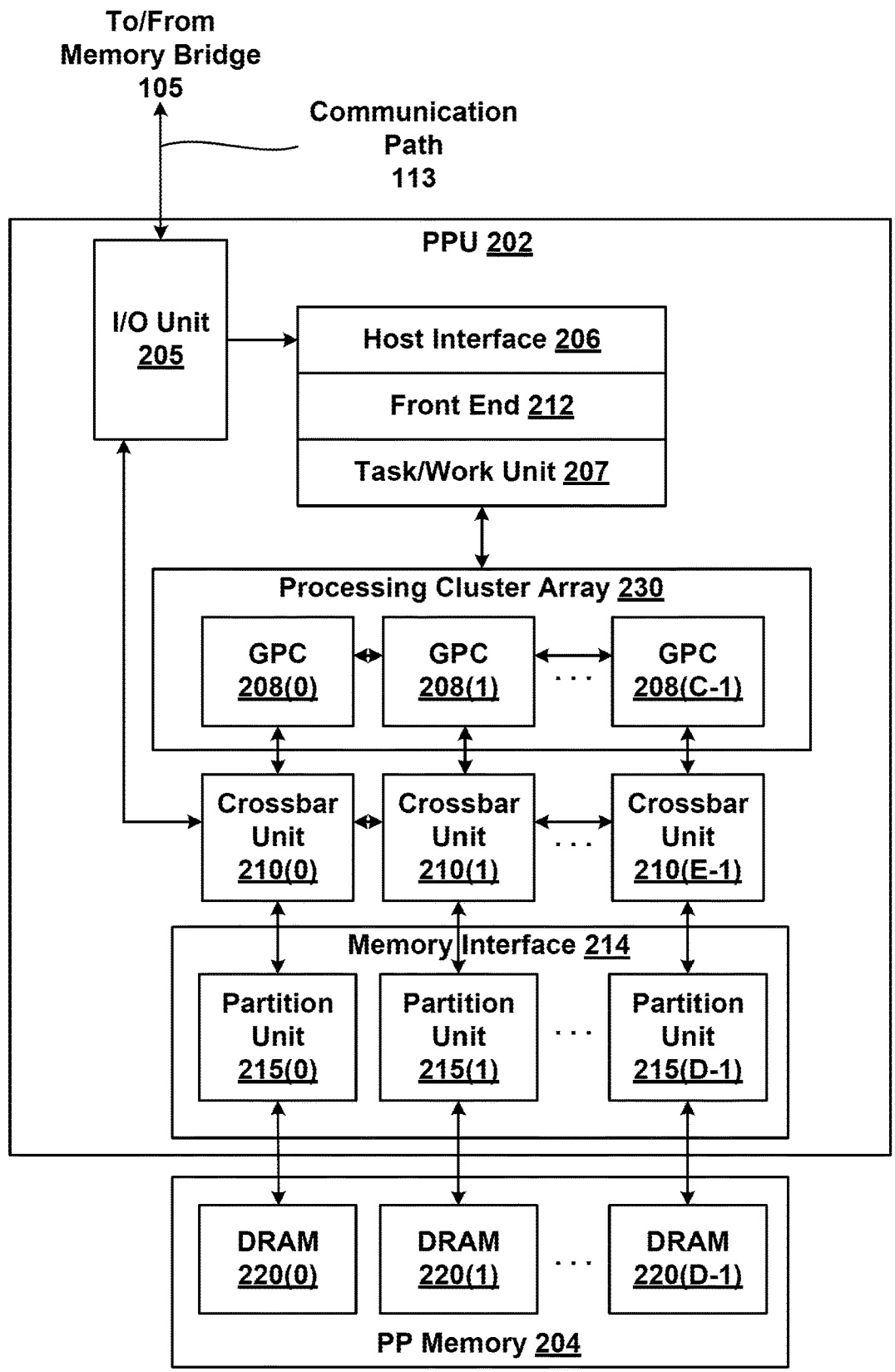
FIG. 2 is a block diagram of a parallel processing unit (PPU) included in the auxiliary processing subsystem of FIG. 1, according to various embodiments.

FIG. 2 is a block diagram of a parallel processing unit (PPU) 202 included in the auxiliary processing subsystem 112 of FIG. 1, according to various embodiments. Although FIG. 2 depicts one PPU 202, as indicated above, auxiliary processing subsystem 112 may include any number of PPUs 202. Further, the PPU 202 of FIG. 2 is one example of an auxiliary processor included in auxiliary processing subsystem 112 of FIG. 1. Alternative auxiliary processors include, without limitation, CPUs, GPUs, DMA units, IPUs, NPUs, TPUs, NNPs, DPUs, VPUs, ASICs, FPGAs, and/or the like. The techniques disclosed in FIGS. 2-5 with respect to PPU 202 apply equally to any type of auxiliary processor(s) included within auxiliary processing subsystem 112, in any combination. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computing system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. Additionally or alternatively, processors and/or auxiliary processors other than CPU 102 may write one or more streams of commands for PPU 202 to a data structure. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computing system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a set of E crossbar units 210, where E≥1. In some embodiments, the crossbar units 210 can be configured as a single crossbar unit 210 rather than a distributed crossbar unit 210(0)-210(E-1) as shown in FIG. 2. Host interface 206 reads each pushbuffer and transmits the command stream stored in the pushbuffer to a front end 212.

As mentioned above in conjunction with FIG. 1, the connection of PPU 202 to the rest of computing system 100 may be varied. In some embodiments, auxiliary processing subsystem 112, which includes at least one PPU 202, is implemented as an add-in card that can be inserted into an expansion slot of computing system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar units 210 are configured to route the output of each GPC 208 to the input of any partition unit 215 or to any other GPC 208 for further processing. GPCs 208 communicate with memory interface 214 via crossbar units 210 to read from or write to various DRAMs 220. In one embodiment, crossbar units 210 have a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar units 210 are directly connected with I/O unit 205. In various embodiments, crossbar units 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity, and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within auxiliary processing subsystem 112, or another auxiliary processing subsystem 112 within computing system 100.

As noted above, any number of PPUs 202 may be included in an auxiliary processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
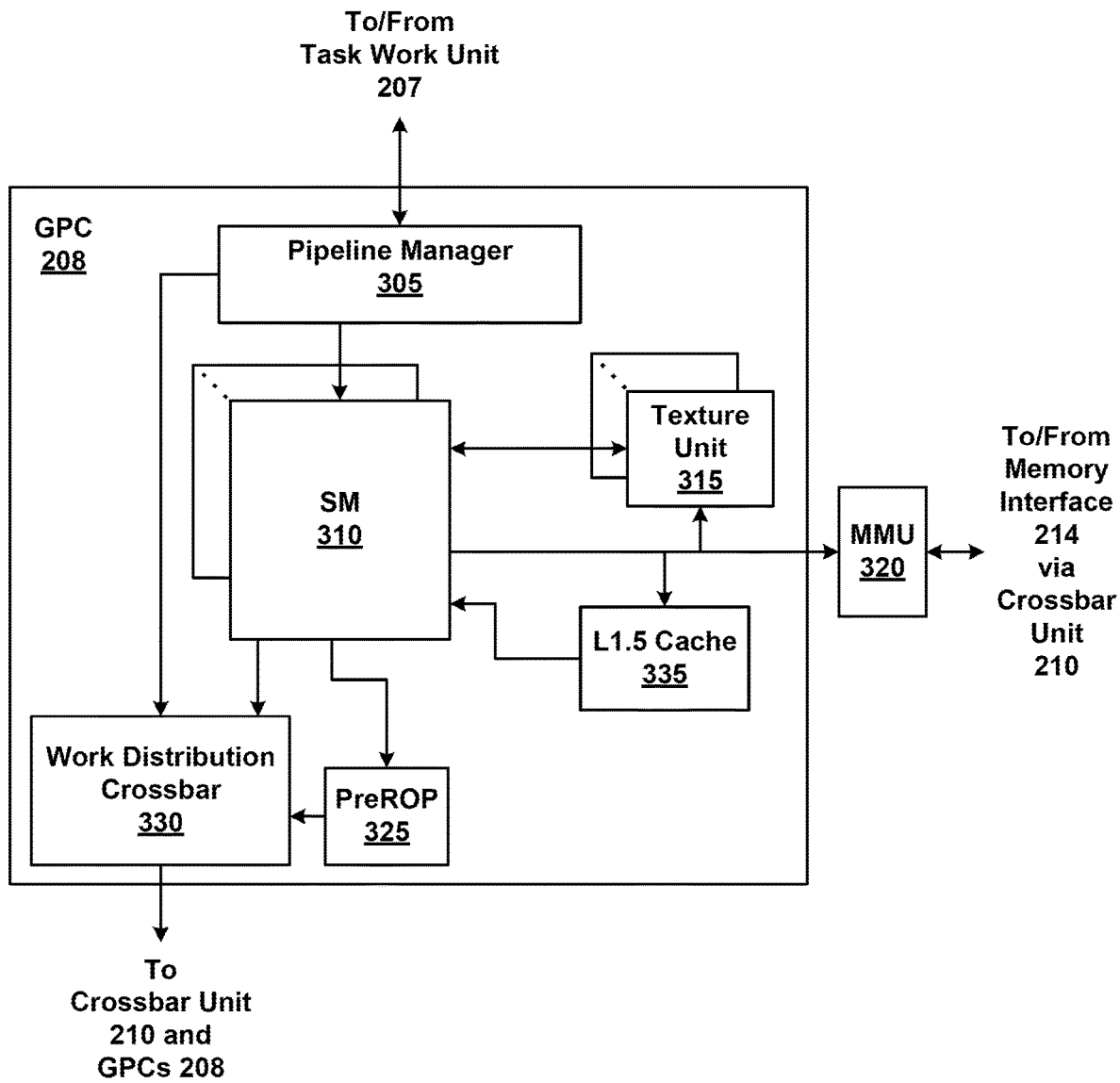
FIG. 3 is a block diagram of a general processing cluster (GPC) included in the parallel processing unit (PPU) of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M 1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (e.g., AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310. In various embodiments, a software application written in the compute unified device architecture (CUDA) programming language describes the behavior and operation of threads executing on GPC 208, including any of the above-described behaviors and operations. A given processing task may be specified in a CUDA program such that the SM 310 may be configured to perform and/or manage general-purpose compute operations.

Although not shown in FIG. 3, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar units 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the various embodiments of the present disclosure.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104.

Please also note, as used herein, references to cache memory may include any one or more technically feasible memories, including, without limitation, an L1 cache, an L1.5 cache, and the L2 caches.

Fully Cache Coherent Virtual Partitions in Multitenant Configurations

Various embodiments include techniques for processing memory operations for virtual partitions in a multitenant multiprocessor system. As described herein, conventional approaches to ensuring memory coherency when multiple GPU partitions, also referred to herein as PPU partitions or, more simply, partitions, access the same memory addresses in CPU memory address space is to put the burden on software engineers to design software applications that do not generate conflicting memory accesses. As a result, each software application has the responsibility of ensuring that multiple PPU partitions do not generate conflicting memory accesses to the same CPU memory location from multiple PPU partitions. Placing this burden on software engineers causes additional complexity in the design and implementation of software applications. Further, software applications that are not designed correctly can lead to memory accesses that load incorrect data, causing incorrect results and/or operational errors.

To resolve these issues arising from conventional approaches, the disclosed techniques allow PPU partitions to coherently cache data in CPU memory address space. The techniques enable CPU 102 to identify different PPU partitions and to determine ownership, or assignment, of a particular memory address in CPU memory address space when multiple PPU partitions are contending for the same memory address. Further, if CPU 102 wants to take back ownership of a particular memory address in CPU memory address space from a PPU partition, then the techniques enable CPU 102 to retrieve the correct data.

In some examples, computing system 100 includes a physical PPU 202 that is partitioned into two PPU partitions. From the perspective of CPU 102, the two PPU partitions appear as two virtual PPUs. The two PPU partitions can generate memory operations, such as load operations to read data from memory, store operations to write data to memory, and/or the like. When PPU 202 generates a memory operation on behalf of one of the two PPU partitions, PPU 202 supplies a source identifier of the corresponding PPU partition. The source identifier enables CPU 102 to track the two PPU partitions as two independent devices. If the two PPU partitions generate two memory operations that attempt to access the same memory address in the CPU memory address space, PPU 202 employs the PPU address map to route the two memory operations through different paths.

Routing different memory operations through different paths is facilitated by routing the memory operations over a partitioned crossbar between the PPUs 202 and memory. Via such a partitioned crossbar, each PPU, and/or each PPU partition, can have a unique path to memory. This same system structure with a partitioned crossbar can also facilitate the assignment of system resources to each PPU 202. As a result of two memory operations accessing the same memory address in the CPU memory address space through different, unique paths, CPU 102 views the two memory operations as coming from different sources. The information about the path taken is embedded as metadata into the source information of the memory operation. When CPU 102 attempts to reclaim ownership of a memory location currently owned by a PPU partition, CPU 102 can return the source information to the PPU partition that owns the memory address. In response, PPU 202 can regenerate the original path and retrieve the requested data from the correct location in the cache memory.

Figure 4:
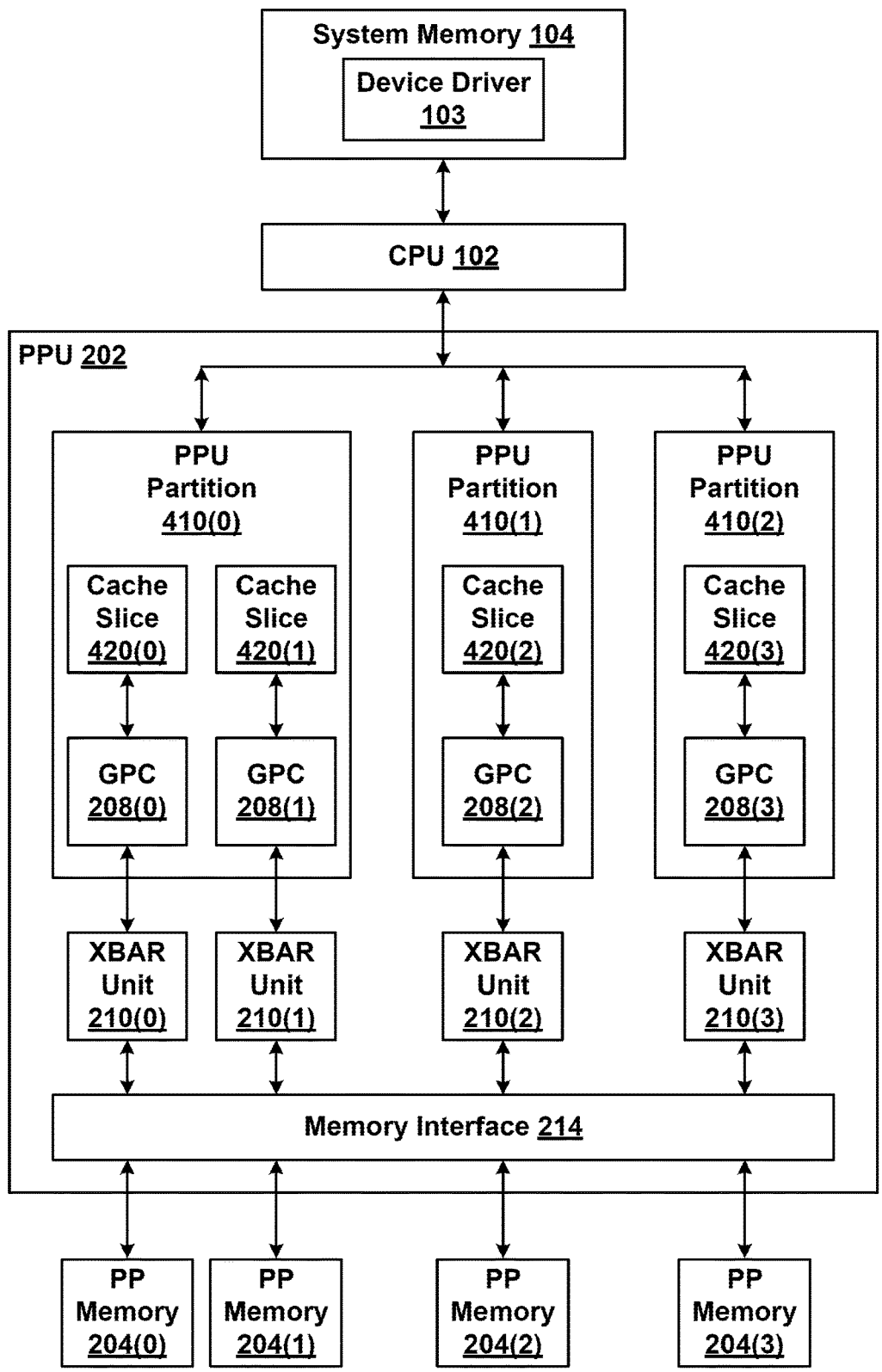
FIG. 4 is a block diagram of a CPU communicating with a PPU of FIGS. 2-3 that is divided into multiple PPU partitions, according to various embodiments.

FIG. 4 is a block diagram of a CPU 102 communicating with a PPU 202 of FIGS. 2-3 that is divided into multiple PPU partitions 410, according to various embodiments. As shown, CPU 102 is coupled to system memory 104 and a PPU 202 of auxiliary processing subsystem 112, either directly or via one or more memory bridges (not shown in FIG. 4). System memory 104 includes device driver 103. As also shown, PPU 202 is configured to have three PPU partitions 410(0), 410(1), 410(2), crossbar (XBAR) units 210(0), 210(1), 210(2), 210(3), and a memory interface 214. In some embodiments, the crossbar units 210 can be configured as a single crossbar unit 210 rather than a distributed crossbar unit 210(0)-210(3) as shown in FIG. 4. PPU partition 410(0) includes two GPCs 208(0)-208(1) and two cache slices 420(0)-420(1). PPU partition 410(1) includes a single GPC 208(2) and a single cache slice 420(2). PPU partition 410(2) also includes a single GPC 208(3) and a single cache slice 420(3). PPU 202 is coupled to different portions of PP memory 204(0), 204(1), 204(2), 204(3) via memory interface 214. System memory 104, CPU 102, PPU 202, PP memory 204, and subcomponents included in these components, function as described in conjunction with FIGS. 1-3 and as further described herein. Cache slices 420 are also referred to herein as cache memory slices.

In operation, an operating system, a hypervisor, a device driver, such as device driver 103, a user process, and/or the like executing on CPU 102, allocates a unique source identifier to each active PPU partition 410. The source identifier identifies the source, that is, the PPU partition 410, that generates each memory operation. When a PPU partition 410 generates a memory operation, the PPU partition 410 includes the corresponding source identifier as an input to a PPU address map that assigns, or maps, unique cache slices 420 in the cache memory to each source identifier. This mapping of source identifiers to cache slices 420 prevents different PPU partitions 410 from generating memory operations that interfere with one another, even when multiple PPU partitions 410 generate memory operations that are accessing the same physical memory location. Accordingly, when a PPU partition 410 generates a memory operation, the PPU partition 410 conveys the corresponding source identifier as part of the memory operation. The different PPU partitions 410 can be arbitrary in size and in allocation of resources. Even so, as long as each PPU partition 410 is allocated a unique source identifier, each PPU partition 410 can coherently access and cache data in CPU memory, such as system memory 104, without interference from other PPU partitions 410. Further, in some examples, CPU 102, other processor, other controller, and/or the like can use the source identifier to select the unique path for each PPU 202 and/or each PPU partition 410.

More specifically, a memory operation and/or other command generated by a PPU partition 410 that can take ownership of a memory location from CPU 102 includes a source identifier field and at least one memory address. The memory address refers to a memory location in system memory 104, PP memory 204, and/or the like. The memory operation can temporarily access the data corresponding to the memory address via the cache memory. More specifically, the data corresponding to the memory address can be stored in a cache line, also referred to herein as a cache memory line, of the cache memory, where a cache line includes a set of data for a range of memory addresses. Each cache line corresponds to a similarly sized set of data in system memory 104, PP memory 204, and/or the like. Therefore, as used herein, a memory address can correspond to a location in a cache line of the cache memory and/or the corresponding location in system memory 104, PP memory 204, and/or the like.

In some examples, the source identifier included in a memory operation generated by a PPU partition 410 and the source identifier supplied to CPU 102 need not be the same source identifier. Instead, these two identifiers can be unique from one another. In such examples, these two source identifiers can be unique from one another so long as an unambiguous mapping between the two source identifiers exists.

In some examples, two or more PPU partitions 410 can reference different cache lines in cache memory, where the different cache lines correspond to the same set of data in system memory 104. In that regard, a first cache slice 420(0) and a second cache slice 420(1) in the cache memory can be assigned to PPU partition 410(0). A first cache line in the first cache slice 420(0) or the second cache slice 420(1) can correspond to a set of data in system memory 104. A third cache slice 420(2) in the cache memory can be assigned to PPU partition 410(1). A second cache line in the third cache slice 420(2) can correspond to the same set of data in system memory 104. Additionally or alternatively, a fourth cache slice 420(3) in the cache memory can be assigned to PPU partition 410(2). A third cache line in the third cache slice 420(3) can correspond to the same set of data in system memory 104. As a result, PPU partitions 410(0), 410(1), and 410(2) can access the same set of data in system memory 104 through different cache lines in different cache slices 420. This condition can lead to data incoherency where the different cache lines in the different cache slices 420 can have different data, even though the different cache lines correspond to the same set of data in system memory 104. Via the disclosed techniques, memory operations generated by the different PPU partitions 410(0), 410(1), and 410(2) include a source identifier that can be used to determine whether the PPU partition 410 generating a memory operation currently has ownership of the corresponding set of data in system memory 104. The disclosed techniques use the source identifier to coherently access the current version of the data associated with the memory operation generated by the PPU partition 410, including coherently accessing such data via multiple cache memory slices and memory systems that can have different, incoherent copies of the data. In this manner, the different PPU partitions 410(0), 410(1), and 410(2) appear to CPU 102 as independent, fully cache coherent request nodes rather than as incoherent portions of a single request node.

If a PPU partition, such as PPU partition 410(0), generates a memory operation and/or other command directed to CPU 102, then PPU partition 410(0) populates the source identifier field of the memory operation with the value of the source identifier assigned to PPU partition 410(0). Prior to transferring ownership of a cache line to the PPU partition 410(0) that generated the memory operation and/or other command, CPU 102, other processor, other controller, and/or the like, extracts the source identifier from the source identifier field and stores the source identifier in memory for tracking and disambiguation purposes. In some examples, the source identifier is stored in a cache tag associated with a cache line that stores data targets by the memory address included in the memory operation. Subsequently, if a different PPU partition 410, such as PPU partition 410(1), generates a memory operation and/or other command directed to a memory location in the same cache line, then CPU 102 withdraws the ownership of the cache line from PPU partition 410(0). CPU 102 transfers ownership of the cache line from PPU partition 410(0) to PPU partition 410(1). As a result, PPU partition 410(1) coherently accesses the current copy of the data stored at the cache line. In this manner, CPU 102, other processor, other controller, and/or the like can track different PPU partitions 410 of a PPU 202 as separate requestors rather than as a single requestor, that is, as a single PPU 202. In some examples, when transferring ownership of a cache line from a first PPU partition, such as PPU partition 410(0), to another PPU partition, such as PPU partition 410(1), the data from the cache line in the first cache slice 420(0) is copied directly to the cache line in the second cache slice 420(1) without passing through CPU 102. Such a direct copy of the data in the cache line can be more efficient than an approach where CPU 102 reads the data from the cache line in the first cache slice 420(0) and then writes the data to the cache line in the second cache slice 420(1). In some examples, when transferring ownership of a cache line from a first PPU partition, such as PPU partition 410(0), to another PPU partition, such as PPU partition 410(1), the data from the cache line in the first cache slice 420(0) is only copied to the cache line in the second cache slice 420(1) if the data in the cache line in the first cache slice 420(0) is dirty. This data is dirty if PPU partition 410(0) has written data to the cache line since acquiring ownership of the cache line and, therefore, has newer data than the copies of the cache line in other cache slices 420, system memory 104, and/or the like. Copying data from cache lines only when the data is dirty can be more efficient than an approach where data from a cache line is copied on transfer of ownership whether or not the data in the cache line is dirty.

When CPU 102 withdraws and/or assumes the ownership of the memory location from a PPU partition, such as PPU partition 410(0), CPU 102 generates and transmits an inquiry operation, referred to as a snoop command, a snoop operation, a probe command, a probe operation, and/or the like. Because PPU partition 410 appears as a different target from the perspective of CPU 102, the source identifier can also be referred to as a target identifier. Consequently, when CPU 102 generates and transmits a snoop command, the snoop command includes a target identifier field with the value of the target identifier. This target identifier is the source identifier of the PPU partition 410(0) that currently owns the memory location. Further, this target identifier is the source identifier of the PPU partition 410(0) that generated the original memory operation and/or other command that resulted in PPU partition 410(0) acquiring ownership of the memory location. The target identifier field of the snoop command is passed as an input to the PPU address map. The PPU address map, in turn, returns the location of the cache slice 420 that contains the requested memory location to CPU 102.

In some examples, an operating system, a hypervisor, a device driver, such as device driver 103, a user process, and/or the like executing on CPU 102, allocates a unique swizzle identifier to each active PPU partition 410. In such examples, CPU 102 can use the unique swizzle identifier as the source identifier. As discussed herein, an operating system, a hypervisor, a device driver, such as device driver 103, a user process, and/or the like executing on CPU 102, generates a set of available swizzle identifiers based on the available hardware resources of the PPU partitions 410. A given swizzle identifier defines a set of hardware boundaries that can be enabled and disabled to isolate different groups of hardware resources within PPU 202 to form PPU partitions 410. In situations where certain hardware resources are unavailable, the operating system, hypervisor, device driver, user process, and/or the like determines that some swizzle identifiers correspond to infeasible partition configurations and should be made unavailable. The operating system, hypervisor, device driver, user process, and/or the like generates a set of swizzle identifiers based on partitioning input. For example, the operating system, hypervisor, device driver, user process, and/or the like could receive input from a user, such as a system administrator, indicating a set of partition options. The operating system, hypervisor, device driver, user process, and/or the like can map those partition options to a corresponding set of swizzle identifiers derived from the set of previously generated available swizzle identifiers. Alternatively, the operating system, hypervisor, device driver, user process, and/or the like can receive the set of swizzle identifiers directly from the system administrator and modify any of these swizzle identifiers that are not included in the set of previously generated available swizzle identifiers.

In some examples, an operating system, a hypervisor, a device driver, such as device driver 103, a user process, and/or the like executing on CPU 102, assigns a designated CPU source identifier to identify CPU 102. The CPU source identifier could be a fixed value that is an invalid PPU partition source identifier, such as a null value, a value that is not included in the set of available source identifiers, a value that is not included in the set of available swizzle identifiers, and/or the like.

It will be appreciated that the system shown herein is illustrative and that variations and modifications are possible. PPU 202 can have any number of PPU partitions 410, GPCs 208, and cache slices 420 in any combination. PPU 202 can be partitioned into number of the PPU partitions 410 in any configuration. Further, GPCs 208 and cache slices 420 can be allocated to any number of PPU partitions 410. For example, PPU 202 of FIG. 4 can be configured such that PPU partition 410(0) can be divided into two PPU partitions 410, where a first PPU partition 410 includes GPC 208(0) and cache slice 420(0), and a second PPU partition 410 includes GPC 208(1) and cache slice 420(1). PPU partition 410(1) and PPU partition 410(2) can be merged to form a single PPU partition 410 that includes GPCs 208(2)-208(3) and cache slices 420(2)-420(3), and so on. Cache slices 420(0)-420(3) can operate as a pool of cache slices 420 that can be distributed to GPCs 208(0)-208(3) as needed. For example, cache slices 420 within a particular PPU partition 410 can be distributed to GPCs 208 included in that PPU partition 410 in any manner. Further, the configuration of PPU partitions 410, GPCs 208, cache slices 420, and other resources is dynamic and can change over time.

In some examples, auxiliary processing subsystem 112 includes multiple PPUs 202. In such examples, the source identifier includes one or more identifiers that identify both the PPU 202 and the PPU partition 410 within the PPU 202 that generated the memory operation. The source identifier could include a first identifier identifying the PPU 202 that includes the PPU partition 410 that generated the memory operation and a second identifier identifying the PPU partition 410 within the PPU 202 that generated the memory operation. Additionally or alternatively, the source identifier could include a single identifier identifying both the PPU 202 and the PPU partition 410 within the PPU 202 that generated the memory operation.

In some examples, the cache lines can be initialized on power on, reset, and/or the like such that CPU 102 has ownership of all cache lines in all cache slices 420 of the cache memory. Alternatively, the cache lines can be initialized to a fixed value indication that neither CPU 102 nor any PPU partition 410 of any PPU 202 has ownership of any cache lines in the cache slices 420 of the cache memory. In such latter cases, ownership of a particular cache line is initially granted to the first processor, such as CPU 102 or a PPU partition 410 in any PPU 202, that generates a memory operation directed to a memory location included in the cache line.

Figure 5:
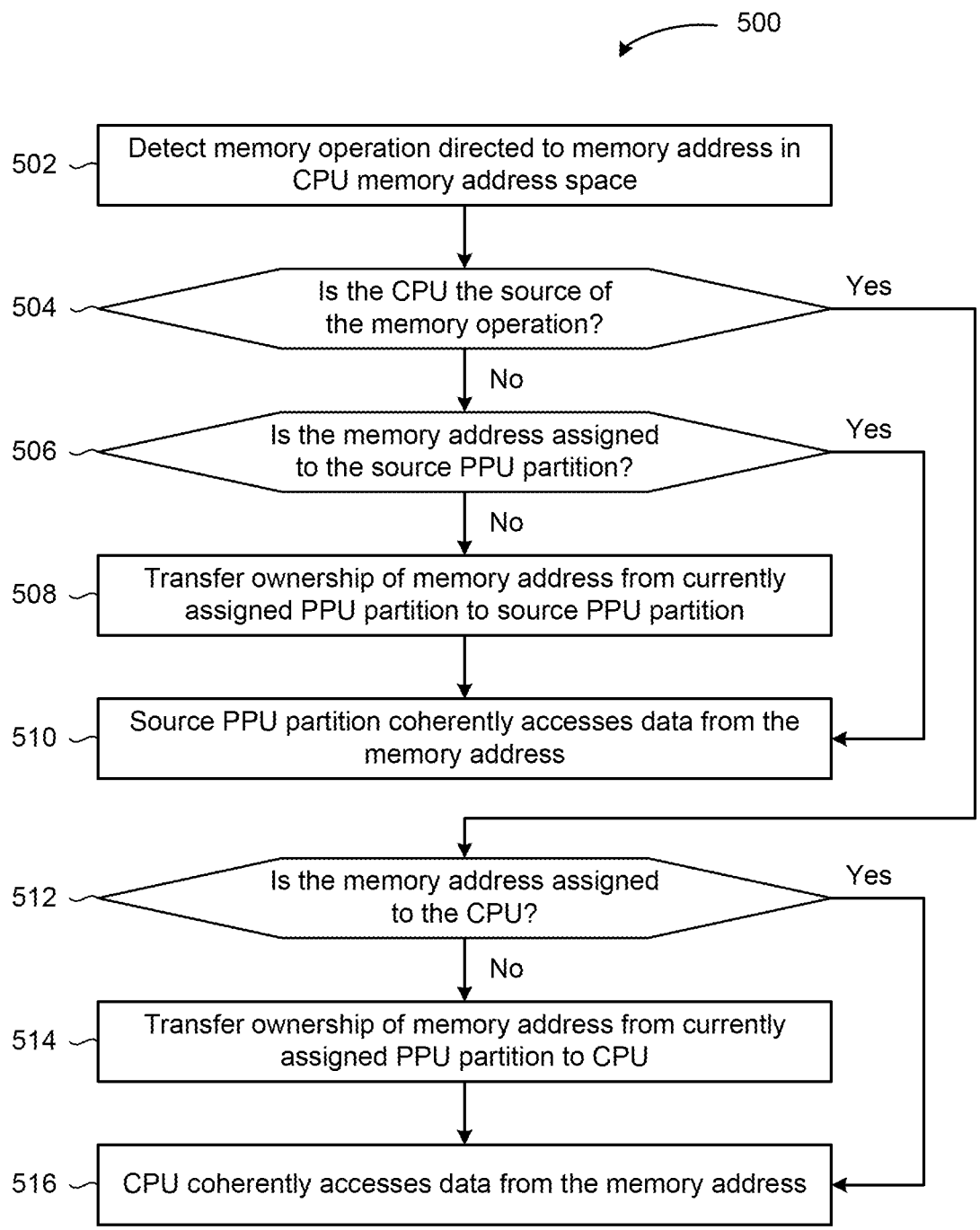
FIG. 5 is a flow diagram of method steps for processing memory operations executed by the PPU partitions of FIG. 4, according to various embodiments.

FIG. 5 is a flow diagram of method steps for processing memory operations executed by the PPU partitions 410 of FIG. 4, according to various embodiments. Additionally or alternatively, the method steps can be performed by one or more alternative processing units including, without limitation, CPUs, GPUs, DMA units, IPUs, NPUs, TPUs, NNPs, DPUs, VPUs, ASICs, FPGAs, and/or the like, in any combination. Although the method steps are described in conjunction with the systems of FIGS. 1-4, persons of ordinary skill in the art will understand that any system configured to perform the method steps, in any order, is within the scope of the present disclosure.

As shown, a method 500 begins at step 502, where a processor detects a memory operation that is directed to a memory address in the CPU memory address space. The CPU memory address space can encompass any portion or all of a memory system associated with a CPU, such as system memory 104 associated with CPU 102 of FIG. 1.

At step 504, the processor determines whether the CPU is the source of the memory operation. As described herein, a memory operation can include a source identifier field that is populated with a source identifier that identifies a PPU partition 410 that generated the memory operation. If, instead, the memory operation does not include such a source identifier field, then the processor can determine that the CPU is the source of the memory operation. Additionally or alternatively, the processor can determine that the CPU is the source of the memory operation if the memory operation includes a source identifier field that is populated with a CPU source identifier that identifies the CPU. The CPU source identifier could be a fixed value that is an invalid PPU partition source identifier, such as a null value, a value that is not included in the set of available source identifiers, and/or the like.

If the CPU is not the source of the memory operation, then a PPU partition is the source of the memory operation. In such cases, the method 500 proceeds to step 506, where the processor determines whether the memory address is assigned to the source PPU partition. In so doing, the processor extracts the source identifier from the source identifier field of the memory operation and compares the extracted source identifier with the source identifier associated with the memory location that was previously stored in memory. If the source identifier from the memory operation matches the source identifier for the memory location as stored in memory, then the processor determines that the memory address from the memory operation is assigned to the source PPU partition. If the source identifier from the memory operation does not match the source identifier for the memory location as stored in memory, then the processor determines that the memory address from the memory operation is not assigned to the source PPU partition. Instead, the processor determines that the memory address from the memory operation is assigned to a different PPU partition.

If, at step 506, the memory address is not assigned to the source PPU partition, then the memory address is assigned to a PPU partition other than the source PPU partition. In such cases, the method 500 proceeds to step 508, where the processor transfers ownership of the memory address from the currently assigned PPU partition to the source PPU partition. Prior to transferring ownership of the memory location to the PPU partition that generated the memory operation detected at step 502, the processor extracts the source identifier from the source identifier field of the memory operation. The processor associates the source identifier with the memory address from the memory location. The processor stores the source identifier in memory for tracking and disambiguation purposes. By storing the source identifier in memory, the processor withdraws the ownership of the memory location from the currently assigned PPU partition and transfers ownership of the memory location to the PPU partition that generated the memory operation.

Further, the processor generates and transmits an inquiry operation, referred to as a snoop command, that includes a target identifier field with the value of a target identifier. This target identifier is the source identifier of the PPU partition that currently owns the memory location included in the memory operation. This target identifier is the source identifier of the PPU partition that generated the original memory operation that resulted in the currently assigned PPU partition acquiring ownership of the memory location. The target identifier field of the snoop command is passed as an input to the PPU address map. The PPU address map, in turn, returns the location of the cache slice that contains the requested memory location to the processor.

At step 510, the source PPU partition coherently accesses data from the memory address. Because, at step 508, the PPU address map returned the location of the cache slice that contains the requested memory location, the source PPU partition can access the requested data from the correct location in the cache memory. The method 500 then terminates or, alternatively, returns to step 502 to process further memory operations.

Returning to step 506, If the memory address is assigned to the source PPU partition, then the method 500 proceeds to step 510 where the source PPU partition coherently accesses data from the memory address, as described above. The method 500 then terminates or, alternatively, returns to step 502 to process further memory operations.

Returning to step 504, if the CPU is the source of the memory operation, then the method 500 proceeds to step 512, where the processor determines whether the memory address is assigned to the CPU. In so doing, the processor determines whether the source identifier associated with the memory location that was previously stored in memory is the CPU source identifier. The CPU source identifier could be a fixed value that is an invalid PPU partition source identifier, such as a null value, a value that is not included in the set of available source identifiers, and/or the like. If the source identifier for the memory location as stored in memory is not the CPU source identifier, then the processor determines that the memory address from the memory operation is assigned to a PPU partition. If the source identifier for the memory location as stored in memory is the CPU source identifier, then the processor determines that the memory address from the memory operation is assigned to the CPU.

If, at step 512, the memory address is not assigned to the CPU, then the memory address is assigned to a PPU partition. In such cases, the method 500 proceeds to step 514, where the processor transfers ownership of the memory address from the currently assigned PPU partition to the CPU. Prior to transferring ownership of the memory location to the CPU, the processor stores the CPU source identifier in memory for tracking and disambiguation purposes. By storing the CPU source identifier in memory, the processor withdraws the ownership of the memory location from the currently assigned PPU partition and transfers ownership of the memory location to the CPU.

Further, the processor generates and transmits a snoop command that includes a target identifier field with the value of a target identifier. This target identifier is the source identifier of the PPU partition that currently owns the memory location included in the memory operation. This target identifier is the source identifier of the PPU partition that generated the original memory operation that resulted in the currently assigned PPU partition acquiring ownership of the memory location. The target identifier field of the snoop command is passed as an input to the PPU address map. The PPU address map, in turn, returns the location of the cache slice that contains the requested memory location to the processor.

At step 516, the CPU coherently accesses data from the memory address. Because, at step 514, the PPU address map returned the location of the cache slice that contains the requested memory location, the CPU can access the requested data from the correct location in the cache memory. The method 500 then terminates or, alternatively, returns to step 502 to process further memory operations.

Returning to step 512, if the memory address is assigned to the CPU, then the method 500 proceeds to step 516 where the CPU coherently accesses data from the memory address, as described above. The method 500 then terminates or, alternatively, returns to step 502 to process further memory operations.

In sum, various embodiments include techniques for processing memory operations in a multiprocessor system. The disclosed techniques allow PPU partitions to coherently cache data in CPU memory address space. The techniques enable a CPU to identify different PPU partitions and to determine ownership of a particular memory address in CPU memory address space when multiple PPU partitions are contending for the same memory address. Further, if the CPU wants to take back ownership of a particular memory address in CPU memory address space from a PPU partition, then the techniques enable the CPU to retrieve the correct data.

In a computing system that includes a physical PPU that is partitioned into two PPU partitions, the two PPU partitions appear as two virtual PPUs from the perspective of the CPU. The two PPU partitions can generate memory operations, such as load operations to read data from memory, store operations to write data to memory, and/or the like. When the PPU generates a memory operation on behalf of one of the two PPU partitions, the PPU supplies a source identifier of the corresponding PPU partition. The source identifier enables the CPU to track the two PPU partitions as two independent devices. If the two PPU partitions generate two memory operations that attempt to access the same memory address in the CPU memory address space, the PPU employs the PPU address map to route the two memory operations through different paths. As a result, the CPU views the two memory operations as coming from different sources. The information about the path taken is embedded as metadata into the source information of the memory operation. When the CPU attempts to reclaim ownership of a memory location currently owned by a PPU partition, the CPU can return the source information to the PPU partition that owns the memory address. In response, the PPU can regenerate the original path and retrieve the requested data from the correct location in the cache memory.

At least one technical advantage of the disclosed techniques relative to the prior art is that, with the disclosed techniques a CPU can employ path information to uniquely identify PPU partitions included in a single PPU and to track the PPU partitions as independent virtual devices. The CPU hardware can use the path information to grant ownership of a memory address in the CPU memory address space to a particular PPU partition. Further, the CPU hardware can use the path information to regain ownership of the memory address from the particular PPU partition. Because this tracking is performed by the CPU hardware, the software applications executing on the CPU and/or PPU partitions do not have to track memory conflicts in order to maintain memory coherency. These advantages represent one or more technological improvements over prior art approaches.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing memory operations in a multiprocessor system, the method comprising:
   determining that a first memory operation generated by a first partition of an auxiliary processor is directed to a first memory address that is owned by a second partition of the auxiliary processor;
   associating the first memory address with the first partition;
   transferring an ownership of the first memory address from the second partition to the first partition; and
   returning data stored at the first memory address to the first partition.

2. The computer-implemented method of claim 1, further comprising:
   determining that a second memory operation generated by a central processing unit is directed to a second memory address that is owned by one of the first partition or the second partition;
   associating the second memory address with the central processing unit;
   transferring an ownership of the second memory address from the first partition or the second partition to the central processing unit; and
   returning data stored at the second memory address to the central processing unit.

3. The computer-implemented method of claim 1, wherein determining that the first memory operation generated by the first partition of the auxiliary processor is directed to the first memory address that is owned by the second partition of the auxiliary processor comprises:
   determining that a first source identifier associated with the first partition is different from a second source identifier associated with the second partition.

4. The computer-implemented method of claim 3, wherein the first source identifier is included in the first memory operation.

5. The computer-implemented method of claim 3, wherein the second source identifier is stored in a cache tag of a cache memory line that stores data associated with the first memory address.

6. The computer-implemented method of claim 3, wherein at least one of:
   the first source identifier comprises a first swizzle identifier that defines a first set of hardware boundaries to isolate a first group of hardware resources to form the first partition; or
   the second source identifier comprises a second swizzle identifier that defines a second set of hardware boundaries to isolate a second group of hardware resources to form the second partition.

7. The computer-implemented method of claim 1, wherein transferring the ownership of the first memory address from the second partition to the first partition comprises:
   extracting a first source identifier included in the first memory operation; and
   overwriting a second source identifier stored in a cache tag of a cache memory line that stores data associated with the first memory address with the first source identifier.

8. The computer-implemented method of claim 1, further comprising:
   determining that a second memory operation generated by to the first partition is directed to the first memory address;
   maintaining the ownership of the first memory address to the first partition or the second partition to a central processing unit; and
   returning data stored at the first memory address to the first partition.

9. The computer-implemented method of claim 1, wherein transferring the ownership of the first memory address from the second partition to the first partition comprises:
   transmitting a snoop command that includes a source identifier that identifies the second partition.

10. The computer-implemented method of claim 9, wherein transferring the ownership of the first memory address from the second partition to the first partition further comprises:

receiving a response to the snoop command from the second partition that includes the data stored at the first memory address.

11. A system comprising:
a memory including instructions;
a first processor coupled to the memory and, when executing the instructions:
generates a first memory operation; and
a second processor that:
determines that the first memory operation is generated by a first partition of the first processor and is directed to a first memory address that is owned by a second partition of the first processor;
associates the first memory address with the first partition;
transfers an ownership of the first memory address from the second partition to the first partition; and
returns data stored at the first memory address to the first partition.

12. The system of claim 11, wherein the second processor further:
determine that a second memory operation generated by a central processing unit is directed to a second memory address that is owned by one of the first partition or the second partition;
associates the second memory address with the central processing unit;
transfers an ownership of the second memory address from the first partition or the second partition to the central processing unit; and
returns data stored at the second memory address to the central processing unit.

13. The system of claim 11, wherein, to determine that the first memory operation generated by the first partition of the first processor is directed to the first memory address that is owned by the second partition of the first processor, the second processor:
determines that a first source identifier associated with the first partition is different from a second source identifier associated with the second partition.

14. The system of claim 13, wherein the first source identifier is included in the first memory operation.

15. The system of claim 13, wherein the second source identifier is stored in a cache tag of a cache memory line that stores data associated with the first memory address.

16. The system of claim 13, wherein at least one of:
the first source identifier comprises a first swizzle identifier that defines a first set of hardware boundaries to isolate a first group of hardware resources to form the first partition; or
the second source identifier comprises a second swizzle identifier that defines a second set of hardware boundaries to isolate a second group of hardware resources to form the second partition.

17. The system of claim 11, wherein, to transfer the ownership of the first memory address from the second partition to the first partition, the second processor:
extracts a first source identifier included in the first memory operation; and
overwrites a second source identifier stored in a cache tag of a cache memory line that stores data associated with the first memory address with the first source identifier.

18. The system of claim 11, wherein the second processor further:
determines that a second memory operation generated by to the first partition is directed to the first memory address;
maintains the ownership of the first memory address to the first partition or the second partition to a central processing unit; and
returns data stored at the first memory address to the first partition.

19. The system of claim 11, wherein, to transfer the ownership of the first memory address from the second partition to the first partition, the second processor:
transmits a snoop command that includes a source identifier that identifies the second partition.

20. The system of claim 19, wherein, to transfer the ownership of the first memory address from the second partition to the first partition, the second processor further:
receives a response to the snoop command from the second partition that includes the data stored at the first memory address.

* * * * *